(12) United States Patent
Chew et al.

(10) Patent No.: US 10,843,273 B2
(45) Date of Patent: Nov. 24, 2020

(54) METHODS OF PURIFYING NANOSTRUCTURES

(71) Applicants: Quantum Chemical Technologies (Singapore) PTE. LTD., Singapore (SG); Singapore Asahi Chemical & Solder Industries PTE. LTD., Singapore (SG); Agency for Science, Technology and Research, Singapore (SG)

(72) Inventors: Kai Hwa Chew, Singapore (SG); Meng Kiong Lim, Singapore (SG); Yong Ling Wu, Innovis (SG); Hui Huang, Innovis (SG)

(73) Assignee: QUANTUM CHEMICAL TECHNOLOGIES (SINGAPORE) PTE. LTD., Singapore (SG)

( * ) Notice: Subject to any disclaimer, the term of this patent is extended or adjusted under 35 U.S.C. 154(b) by 182 days.

(21) Appl. No.: 15/780,063

(22) PCT Filed: Nov. 11, 2016

(86) PCT No.: PCT/GB2016/053738
§ 371 (c)(1),
(2) Date: May 30, 2018

(87) PCT Pub. No.: WO2017/098207
PCT Pub. Date: Jun. 15, 2017

(65) Prior Publication Data
US 2018/0354039 A1  Dec. 13, 2018

(30) Foreign Application Priority Data
Dec. 8, 2015  (GB) .................................. 1521581.7

(51) Int. Cl.
B22F 9/24 (2006.01)
B22F 1/00 (2006.01)
B01D 61/14 (2006.01)

(52) U.S. Cl.
CPC .............. *B22F 9/24* (2013.01); *B22F 1/0022* (2013.01); *B22F 1/0025* (2013.01);
(Continued)

(58) Field of Classification Search
CPC ................................ B22F 9/24; B22F 1/0022
(Continued)

(56) References Cited

U.S. PATENT DOCUMENTS

2012/0165186 A1  6/2012  Edwards et al.
2013/0039806 A1*  2/2013  Blinn .................... B22F 1/0081
420/501

FOREIGN PATENT DOCUMENTS

JP  2013199690 A  10/2013
JP  5507440 B2  5/2014
(Continued)

OTHER PUBLICATIONS

"GB Search Report dated Aug. 8, 2016".
(Continued)

*Primary Examiner* — Weiping Zhu
(74) *Attorney, Agent, or Firm* — Benjamin C. Armitage; Billion & Armitage (57) ABSTRACT

The present invention relates to methods of purifying nanostructures. The nanostructures may be silver nanowires.

15 Claims, 8 Drawing Sheets

(52) U.S. Cl.
CPC .......... *B22F 1/0088* (2013.01); *B01D 61/147* (2013.01); *B01D 2315/04* (2013.01); *B01D 2315/10* (2013.01)

(58) Field of Classification Search
USPC .......................................................... 75/343
See application file for complete search history.

(56) References Cited

FOREIGN PATENT DOCUMENTS

| | | |
|---|---|---|
| JP | 2015206081 A | 2/2015 |
| WO | 9215539 A1 | 9/1992 |
| WO | 2009107694 A1 | 9/2009 |
| WO | 2013146509 A1 | 10/2013 |
| WO | 2016035856 A1 | 3/2016 |
| WO | 2017098207 A1 | 6/2017 |

OTHER PUBLICATIONS

"PCT Search Report dated Mar. 6, 2017".
Pradel, et al., "Purification of Nanowires", Angewandte Chemie (International Ed. in English), vol. 123, No. 15, Apr. 4, 2011, 3474-3478.

* cited by examiner

METHODS OF PURIFYING NANOSTRUCTURES

The present application is a National Stage Application of PCT/GB2016/053738, filed on Nov. 11, 2016, which claims benefit of the priority of the United Kingdom patent application No. 1521581.7, entitled "Methods Of Purifying Nanostructures", which application was filed with the Intellectual Property Office of the United Kingdom on Dec. 8, 2015, the entire contents of which are incorporated herein by reference.

DESCRIPTION OF INVENTION

The present invention relates to methods of purifying nanostructures. More particularly, the present invention relates to methods of purifying silver nanowires. The present invention also relates to nanostructures and nanowires purified by the methods.

Transparent conductors refer to thin conductive films coated on high-transmittance surfaces or substrates. Transparent conductors may be manufactured to have surface conductivity while maintaining reasonable optical transparency. Such surface conducting transparent conductors are widely used as transparent electrodes in flat liquid crystal displays, touch panels, electroluminescent devices and thin film photovoltaic cells; as anti-static layers and as electromagnetic wave shielding layers.

Vacuum deposited metal oxides, such as ITO (Indium Tin Oxide) are often used to provide optical transparency and electrical conductivity to dielectric surfaces such as glass and polymeric films. ITO on flat liquid crystal displays, for example, typically provides a transmission value of >90% and sheet resistance of approximately 10 Ω/□. Metal oxide films are fragile and prone to damage during bending. They also need relatively high deposition temperatures and/or high annealing temperatures to achieve high conductivity levels. When a substrate absorbs water, e.g. polycarbonate, a metal oxide film may lose adhesion. Therefore, metal oxide films do not function particularly well on flexible substrates. Furthermore, vacuum deposition is relatively costly and requires specialist equipment.

Metal nanostructures such as silver nanowires serve as an alternative transparent conductor to ITO as the industry looks for more flexible and bendable substrate materials for applications including wearable technology, printed lights, solar cells, organic emitting diodes and many other optoelectronic devices. In addition, metal nanostructures such as silver nanowires are now used in flat panel displays instead of ITO films.

Silver nanowires used as transparent conductors often include a variety of lengths of nanowire to permit formation of a strongly conducting network of nanowires.

Silver nanowires can be synthesised by the reduction of silver nitrate dissolved in the presence of poly(vinyl pyrrolidone) (PVP) using a "polyol method" described in Y. Sun, B. Gates, B. Mayers and Y. Xia, "Crystalline silver nanowires by soft solution processing", Nanoletters, 2002, 2(2) 165-168. The polyol method includes the reduction of a precursor (e.g. a metal salt) of the metal nanostructure by a polyol (e.g. ethylene glycol) in the presence of PVP. Typically, the reduction is carried out at no more than 230° C. Ethylene glycol serves the dual functions as the solvent and the reducing agent. Typically, the shapes and sizes of the nanostructures formed are affected by parameters including the relative amounts of PVP and the metal salt, reaction time, and reaction temperature. Silver nanowires formed by this reaction are believed to form by way of the following reactions:

$$2HOCH_2CH_2OH \rightarrow 2CH_3CHO + 2H_2O$$

$$2Ag^+ + 2CH_3CHO \rightarrow CH_3CHO-OHCCH_3 + 2Ag + 2H^+$$

Known methods of forming nanostructures (e.g. silver nanowires) by the polyol method use sedimentation and/or "dead-end" filtration to purify the nanowires and are not scalable above approximately 1 litre batches. Sedimentation and/or "dead-end" filtration only work on a relatively small scale and do not produce particularly pure nanowires with preferable lengths and/or preferable ranges of lengths.

There is a need to upscale methods of purifying and forming nanostructures (e.g. silver nanowires).

According to a first aspect of the present invention, there is provided a method of purifying nanostructures, the method comprising:

providing a plurality of nanostructures in solution; and
filtering the nanostructures in solution by cross-flow filtration.

Preferably, wherein the nanostructures are nanowires.

Further preferably, wherein the nanowires are metallic or semiconducting.

Advantageously, wherein the nanowires are metallic and include Ag, Au, Pt, Cu, Co, Fe and/or Ni.

Preferably, wherein the nanowires are silver nanowires.

Further preferably, wherein the nanowires have a length (longest dimension) of from 30 μm to 90 μm.

Advantageously, wherein the nanowires have a width (shortest dimension) of from 80 nm to 150 nm.

Preferably, wherein the nanowires have an aspect ratio (length divided by width) of from 200 to 900.

Further preferably, wherein the step of providing a plurality of nanostructures in solution includes forming the nanostructures.

Advantageously, wherein forming the nanostructures includes forming the nanostructures by the polyol method.

Preferably, wherein the nanostructures are silver nanowires and the polyol method proceeds by the reactions:

$$2HOCH_2CH_2OH \rightarrow 2CH_3CHO + 2H_2O$$

$$2Ag^+ + 2CH_3CHO \rightarrow CH_3CHO-OHCCH_3 + 2Ag + 2H^+.$$

Further preferably, wherein the step of forming the nanostructures occurs on a scale of greater than 1 litre batches.

Advantageously, wherein the step of filtering the nanostructures in solution by cross-flow filtration includes the step of passing the solution comprising nanostructures through a cross-flow filter.

Preferably, wherein step of passing the solution comprising nanostructures through a cross-flow filter includes passing the solution through a cross-flow filter having a mean mesh size of 20 to 40 μm.

Further preferably, wherein step of passing the solution comprising nanostructures through a cross-flow filter includes passing the solution through a cross-flow filter having a mean mesh size of 30 μm plus or minus 10%.

Advantageously, wherein the step of filtering the nanostructures in solution by cross-flow filtration includes the step of passing the solution comprising nanostructures through a cross-flow filter at a rate of 400 ml/min to 2 l/min.

Preferably, wherein the step of filtering the nanostructures in solution by cross-flow filtration includes the step of passing the solution comprising nanostructures through a cross-flow filter at a rate of 500 ml/min to 1 l/min.

Further preferably, wherein the step of filtering the nanostructures in solution by cross-flow filtration includes the step of passing the solution comprising nanostructures through a cross-flow filter, the cross-flow filter comprising a vibration system for vibrating the mesh and mitigating clogging of the membrane.

According to another aspect of the present invention, there is provided a method of forming a transparent conductor, the method comprising:
purifying nanostructures according to the methods set out above; and
fabricating a transparent conductor incorporating the nanostructures.

According to another aspect of the present invention, there are provided nanostructures obtainable by the methods set out above.

According to another aspect of the present invention, there are provided nanostructures obtained by the methods set out above.

According to another aspect of the present invention, there are provided transparent conductors obtainable by the methods set out above.

According to another aspect of the present invention, there are provided transparent conductors obtained by the methods set out above.

According to another aspect of the present invention, there is provided the use of a cross-flow filter to filter a solution comprising nanostructures.

Preferably, wherein the cross-flow filter has a mean mesh size of 20 to 40 μm.

Further preferably, wherein the cross-flow filter has a mean mesh size of 30 μm plus or minus 10%.

Advantageously, wherein the method occurs on a scale of greater than 1 litre batches.

Preferably, wherein the nanostructures are silver nanowires.

Further preferably, wherein forming the nanostructures includes forming the nanostructures by the polyol method.

Advantageously, wherein the nanostructures are silver nanowires and the polyol method proceeds by the reactions:

$2HOCH_2CH_2OH \rightarrow 2CH_3CHO + 2H_2O$ $2Ag^+ + 2CH_3CHO \rightarrow CH_3CHO-OHCCH_3 + 2Ag + 2H^+$.

Embodiments of the invention are described below with reference to the accompanying drawings, in which.

Some of the terms used to describe the present invention are set out below.

"Cross-flow filtration" refers to filtration where the filter has an inlet for a feed, an outlet for a retentate and a filter through which a permeate passes. Typically, a feed is introduced into the inlet, the feed passes through the filter and certain components of the feed leave through the filter as permeate whilst others leave as retentate. In cross-flow filtration, as opposed to "dead-end" filtration, the filter cake is substantially washed away during the filtration method and does not block the filter; this increases the time that filtration can occur and permits continuous cross-flow filtration.

"Nanostructures" are structures which are sized in at least one dimension from 1 to 90 μm, optionally 20 nm to 300 nm, optionally from 1 nm to 100 nm. Examples of nanostructures include, but are not limited to, nanowires (e.g. silver nanowires), nanotubes (e.g. carbon nanotubes), buckminsterfullerene, nanoparticles, nanopowders, nanobelts and nanocrystals. Compared to larger scale materials; nanostructures have a high ratio of surface area to volume; this results in nanostructures having different properties compared to larger scale materials.

"Nanowires" are nanostructures which have a length (longest dimension) of from 20 nm to 300 μm, optionally from 20 nm to 90 μm, optionally from 1 μm to 15 μm, or 30 μm to 90 μm, or 20 μm to 80 μm, and a width (shortest dimension) of from 1 nm to 300 nm, optionally from 1 nm to 150 nm, 100 nm, 50 nm or 10 nm, optionally from 80 nm to 150 nm, and an aspect ratio (length divided by width) of from 20 to 300,000, optionally 20 to 90,000, optionally 200 to 900, or 20 to 50, optionally to 40 or 30. Preferred nanowires are generally cylindrical, although they can have different geometric shapes, for example rectangular. If the nanowires are not cylindrical, the aspect ratio is calculated as the length divided by the greatest dimension across a cross-section of the nanowire.

Nanowires can be metallic (for example Ag, Au, Pt, Cu, Co, Fe and Ni) or semiconducting (for example Si, $SnO_2$, $WO_3$, ZnO, $TiO_2$, InP, CuO, $Cu_2O$, NiO, $MnO_2$, $V_2O_5$ and GaN), but not insulating.

"Nanoparticles" are particles having at least one dimension from 1 nm to 100 nm, optionally from 1 nm to 10 nm, and an aspect ratio (length divided by width) of from 1 to 4, preferably from 1 to 2. Nanoparticles can be metallic (for example Au, Pt, Ag, Fe, Pd, Rh, ZnS and CdSe) or semiconducting (for example Si, $SnO_2$, $WO_3$, ZnO, $TiO_2$, InP, CuO, $Cu_2O$, NiO, $MnO_2$, $V_2O_5$ and GaN), but not insulating.

Silver Nanowire Preparation

Metal nanowires can be prepared by the solution-phase reduction of a metal salt in the presence of a polyol and PVP. This reaction is referred to as the "polyol method". An example of the polyol method to form silver nanowires is the solution-phase reduction of silver nitrate in the presence of ethylene glycol and PVP.

A synthesis of silver nanowires can be described by the following general steps:

1. Introduce a solution of silver nitrate (for example ≥99.0% as sold by Sigma Aldrich™ in the UK), ethylene glycol (for example anhydrous, 99.8% as sold by Sigma Aldrich™ in the UK) and PVP (for example powder as sold by Sigma Aldrich™ in the UK; optionally with an average molecular weight of 55,000) into a clean reaction vessel. In one example, the relative molar amounts of silver nitrate to PVP in ethylene glycol is 1:12.5 plus or minus 10%. Within this relative molar ratio, the amount of PVP in ethylene glycol is 0.0015M plus or minus 10%.
2. Optionally, include a source of halide ions, e.g. NaCl, and/or a source of metal ions such as any one or more of Cu, Fe and Pt. In some examples, the metal ions are provided in solution from Cu, Fe and/or Pt chlorides or nitrates. These components are optionally added as dopants to the solution.
3. Stir the reaction mixture at 120-140° C., preferably 130° C., for 40-60 minutes, preferably 50 minutes. The solution changes colour from grey to clear yellow upon formation of silver nanowires.

Following the above general protocol results in the formation of a reaction product mixture, including silver nanowires. The silver nanowires are within a solution including polyols and PVP, along with unwanted reaction products including unwanted small nanostructures.

Previous methods of cleaning the silver nanowires included dilution of the reaction product mixture with IPA (isopropanol; for example 70% in $H_2O$ as sold by Sigma Aldrich™ in the UK). This method permitted the sedimentation of silver nanowires by way of the longer wires sinking more, relative to shorter wires. The shorter/smaller wires floated relative to the longer/heavier wires and are decanted off, with a new batch of IPA added. Such a method is often carried out seven or more times to obtain relatively clean nanowires in IPA. Such a sedimentation method takes time (approximately one week until completion) because each sinking step takes time.

The longer the nanowires the better the quality of the thin conductive films formed by the nanowires. In the field of silver nanowires serving as an alternative transparent conductor to ITO, the length of silver nanowires used ranges from 20 μm up to and including 200 μm. Silver nanowires shorter than 20 μm do not generally form useful thin conductive films. It is difficult to consistently form silver nanowires longer than 200 μm.

Previous methods of cleaning or filtering the silver nanowires alternatively included filtering by "dead-end" filtering. In "dead-end" filtering a substantial proportion of the desired silver nanowires are trapped in the filter cake and there is little or no control over the length of the filtered silver nanowires.

When looking to scale up production of nanostructures, in particular silver nanowires, sedimentation processing and/or "dead-end" filtering are not feasible above approximately 1 litre batches.

According to the present invention, the reaction product mixture, including silver nanowires, is filtered using a cross-flow filtration method. An apparatus for carrying out this method is shown schematically in FIG. 1.

The reaction product mixture is first diluted with IPA (isopropanol; for example 70% in $H_2O$ as sold by Sigma Aldrich™ in the UK) to lower the viscosity and permit flow through the filtration system 1. The diluted reaction product mixture is reaction product mixture 10 in FIG. 1. The diluted reaction product in some embodiments is diluted with enough IPA such that the density of the diluted reaction product is within 10% of the density of pure IPA (i.e. within 10% of 786 kg/m³).

Figure 1:
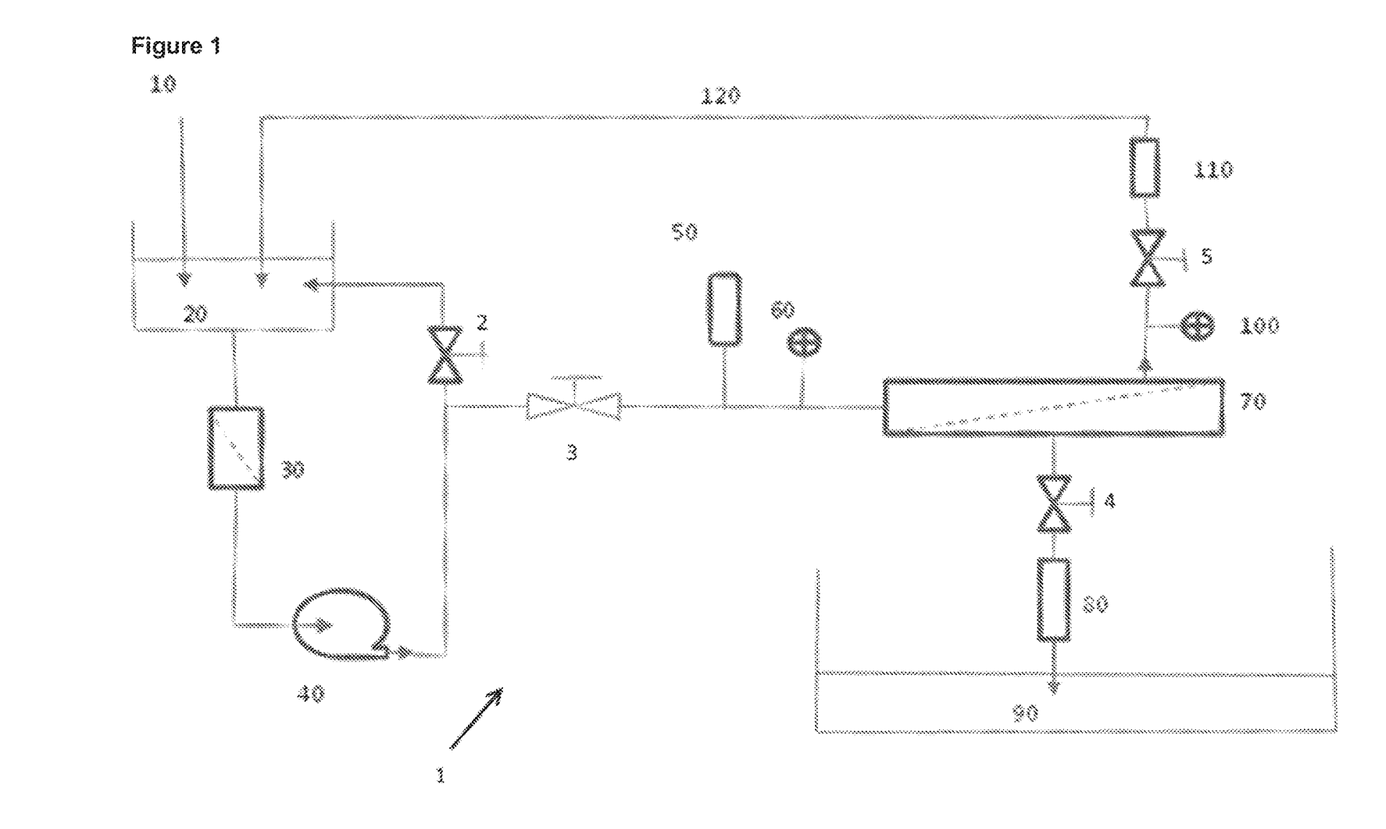
FIG. 1 is a schematic diagram of an aspect of the method according to the present invention.

The diluted reaction product mixture 10 is introduced into the feed tank 20. A peristaltic pump 40, operating at 7-9 litres per minute, forces movement of the diluted reaction product mixture 10 through the prefilter 30. The prefilter 30 has a wire mesh filter with approximately 120 μm pores. The prefilter 30 acts to remove any large particulate matter.

After the peristaltic pump 40, there are two valves 2,3; one valve 2 optionally permits return of the mixture to the feed tank 20; the other valve 3 permits flow of the mixture to the cross-flow filter 70. In the usual in-line method, the valve 2 is closed and the valve 3 is open, thus permitting flow of the mixture to the cross-flow filter 70.

The lung tank 50 is effectively a pressure valve and permits release of pressure within the filtration system 1, if necessary. The pressure sensor 60 provides a pressure reading so that the pressure within the filtration system 1 can be monitored.

The cross-flow filter 70 includes a membrane. In this example, the mesh of the filter is a metal mesh, optionally stainless steel, with a mesh spacing of 30 μm. In other examples, where different lengths of nanowires or dimensions of nanostructures are preferred, the mesh spacing is changed accordingly. The flow of feed into the cross-flow filter 70 in this example is 750 ml/min. In other embodiments, the flow of feed into the cross-flow filter 70 can be from 400 ml/min to 2 l/min. In some embodiments, the cross-flow filter 70 incorporates a vibration system (not shown) which vibrates the mesh and prevents the membrane from clogging.

Relatively small particles flow through the mesh of the cross-flow filter 70 through a valve 4 before a flowmeter 80 and into a permeate tank 90. The valve 4 is included to provide the option of closing flow to the permeate tank 90. The flowmeter 80 is included to provide information on the flow rate into the permeate tank 90.

Relatively large nanowires flow through the cross-flow filter 70 and exit as retentate. The pressure sensor 100 provides a pressure reading so that the pressure within the filtration system 1 can be monitored. The retentate then flows through a valve 5 and then a flowmeter 110. The valve 5 is included to provide the option of closing flow of the retentate. The flowmeter 110 is included to provide information of the flow rate of the retentate.

The retentate is then optionally returned to the feed tank 20 and returned to the start of the cross-flow filtration method. The retentate includes generally clean silver nanowires with impurities removed as permeate from the cross-flow filter. The cross-flow filtration step can be undertaken once in the method, or the cross-flow filtration step can be undertaken a number of times, including 2, 3, 4, 5, 6, 7, 8, 9, 10 or more times. Aliquots of cleaned/filtered solution can be taken of the retentate at 120. The aliquots can be tested for purity of the silver nanowires.

In some embodiments, additional diluted reaction product mixture 10 is introduced into the filtration system 1 as and when needed, e.g. when substantially clean silver nanowires are removed from the system. In some embodiments, additional diluted reaction product mixture 10 is introduced into the filtration system 1 continuously because of the continuous loss of permeate to the permeate tank 90.

Carrying out the method as described in the example above typically formed silver nanowires with a length of from 30 μm to 90 μm, a width of from 80 nm to 150 nm and an aspect ratio of from 200 to 900; the yield was 40% or more. The silver nanowires produced were found to produce transparent conductive films or substrates; the conductive films or substrates having beneficial haze (less than 3%) and transmission readings (greater than 85%) and beneficial sheet resistance readings.

After formation of silver nanowires, the silver nanowires are dried and packed under vacuum to prevent oxidation. Alternatively, the silver nanowires are dispersed in a highly purified alcohol solution.

In an exemplary embodiment:
1. 46 g of PVP dissolved in 500 mL of ethylene glycol was stirred in a reactor together with 1.0 mL of 0.1M $CuCl_2$ in ethylene glycol and 1.75 mL of 0.2M $CuNO_3$ in ethylene glycol.
2. The reactor was heated at 150° C. for 1 hour.
3. After 1 hour, 2.95 mL of 2 m $AgNO_3$ in ethylene glycol was added to the reaction mixture and stirred for 30 minutes.
4. A further 35 mL of 2M $AgNO_3$ in ethylene glycol was added to the reaction mixture and stirred for 40 minutes.
5. A sample of the reaction mixture was taken and the length of silver nanowires formed was checked by microscope.
6. When the reaction was complete, the solution was cooled to room temperature (20° C.).
7. The solution was diluted with enough IPA such that the density of the diluted reaction product was within 10% of the density of pure IPA.
8. The diluted reaction product was then cycled through the filtration system 1 three times to produce a solution of generally pure silver nanowires. The yield of silver nanowires was 40%.

Figure 2:
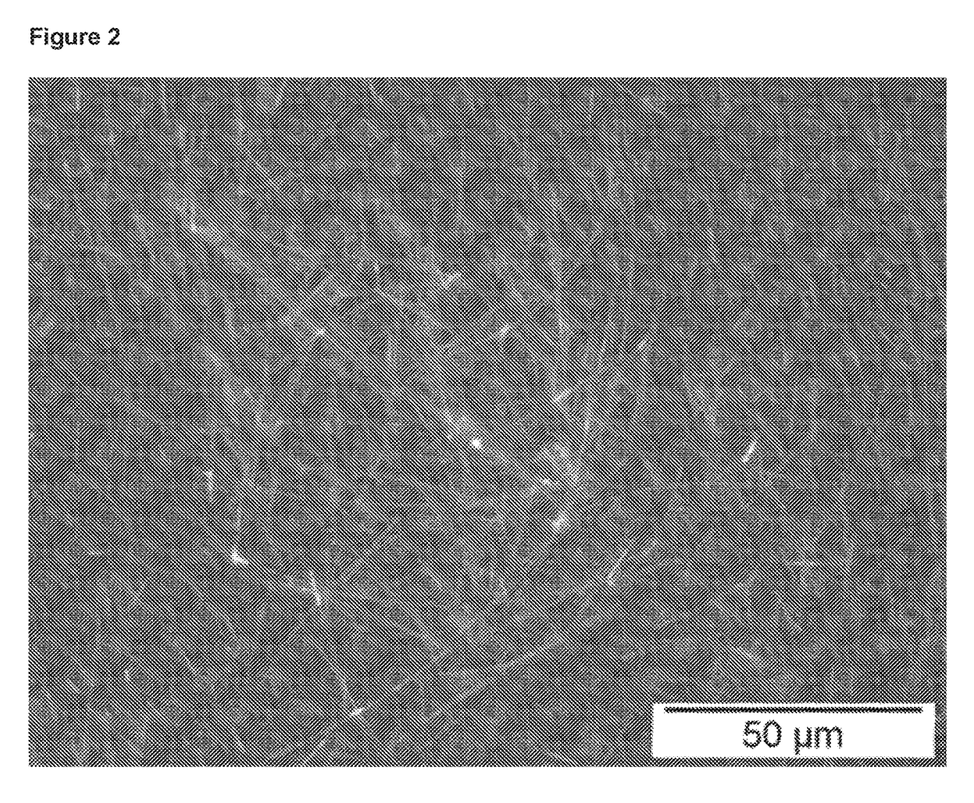
FIG. 2 is a microscope photograph of silver nanowires formed from a polyol method before filtering.

FIG. 2 is a microscope photograph of the diluted reaction product from step 7 of the exemplary embodiment, i.e. silver nanowires before a filtering step according to the present invention. The silver nanowires are of various lengths and are generally disordered. The image of FIG. 2 was obtained using an optical microscope with 50× magnification. The microscope used to take the image was an Olympus BX60M and the camera was an Olympus SC30.

Figure 3:
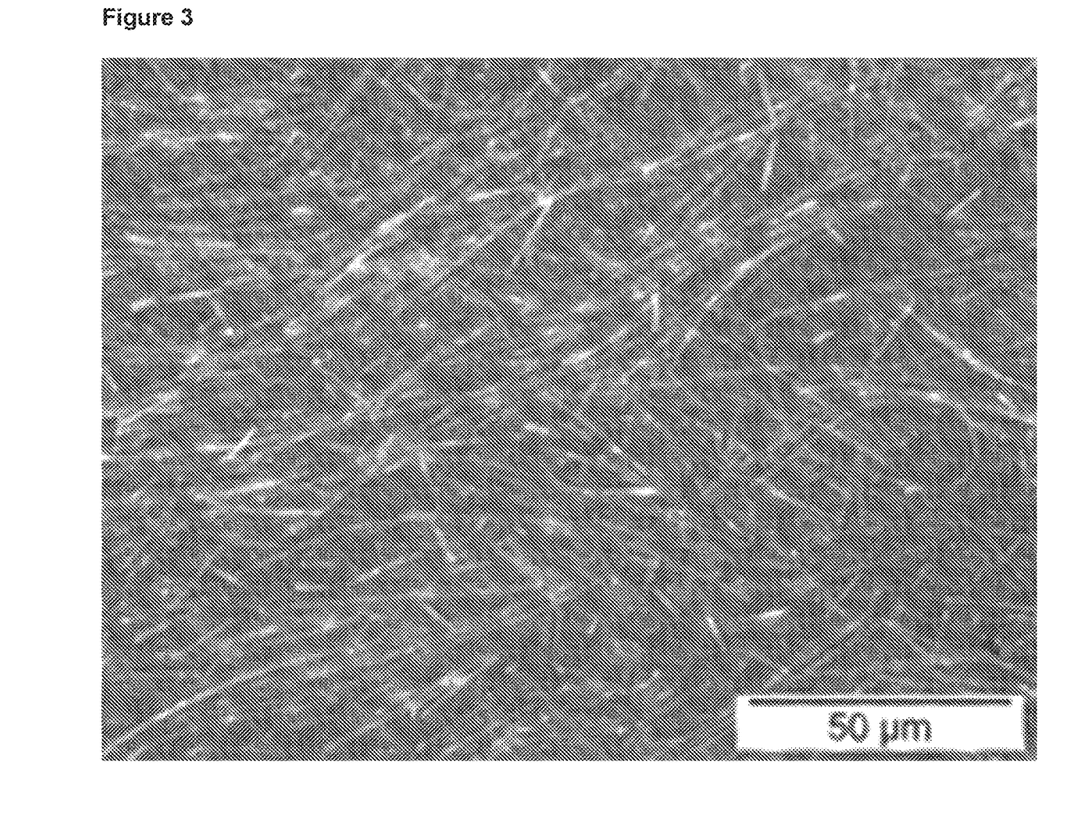
FIG. 3 is a microscope photograph of silver nanowires after a filtering step according to an aspect of the present invention.

FIG. 3 is a microscope photograph of silver nanowires after only one filtering step according to step 8 of the exemplary embodiment (e.g. from the retentate in FIG. 1). The silver nanowires are more uniform and purer than the silver nanowires shown in FIG. 2, i.e. before cleaning. The image of FIG. 3 was obtained using an optical microscope with 50× magnification. The microscope used to take the image was an Olympus BX60M and the camera was an Olympus SC30.

Figure 4:
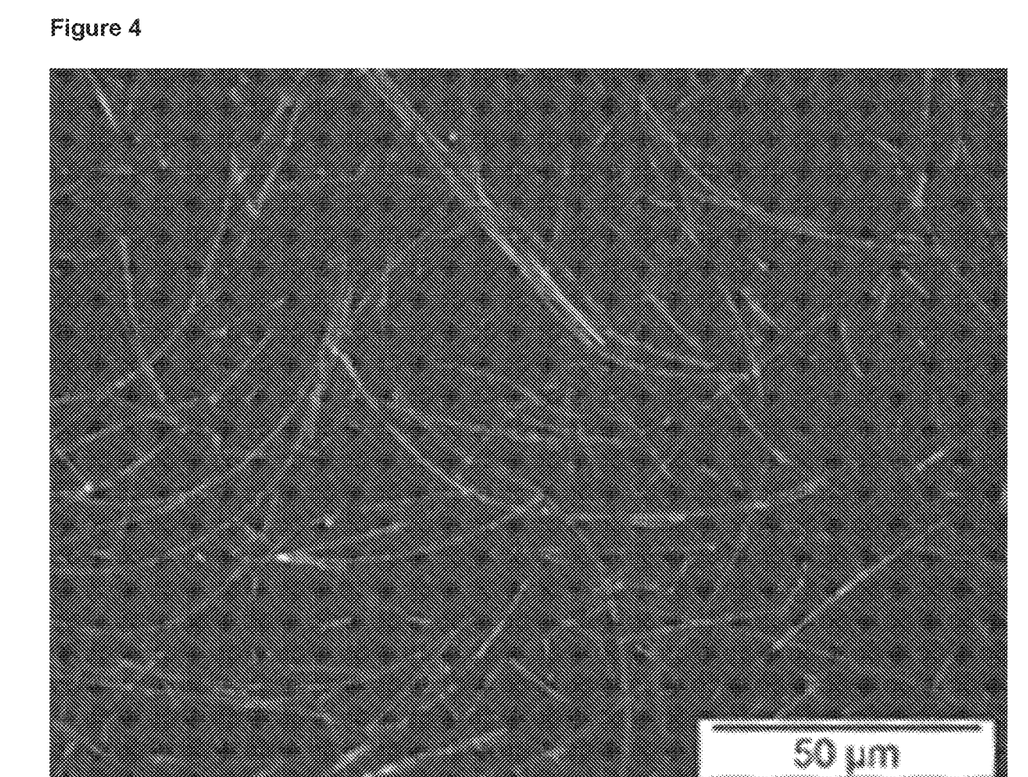
FIG. 4 is a microscope photograph of silver nanowires after more than one filtering steps according to an aspect of the present invention.

FIG. 4 is a microscope photograph of silver nanowires after the three filtering steps according to step 8 of the exemplary embodiment (e.g. from the retentate in FIG. 1). The silver nanowires are all of a similar length and are purer than the silver nanowires shown in FIG. 3. The image of FIG. 4 was obtained using an optical microscope with 50× magnification. The microscope used to take the image was an Olympus BX60M and the camera was an Olympus SC30.

Figure 5:
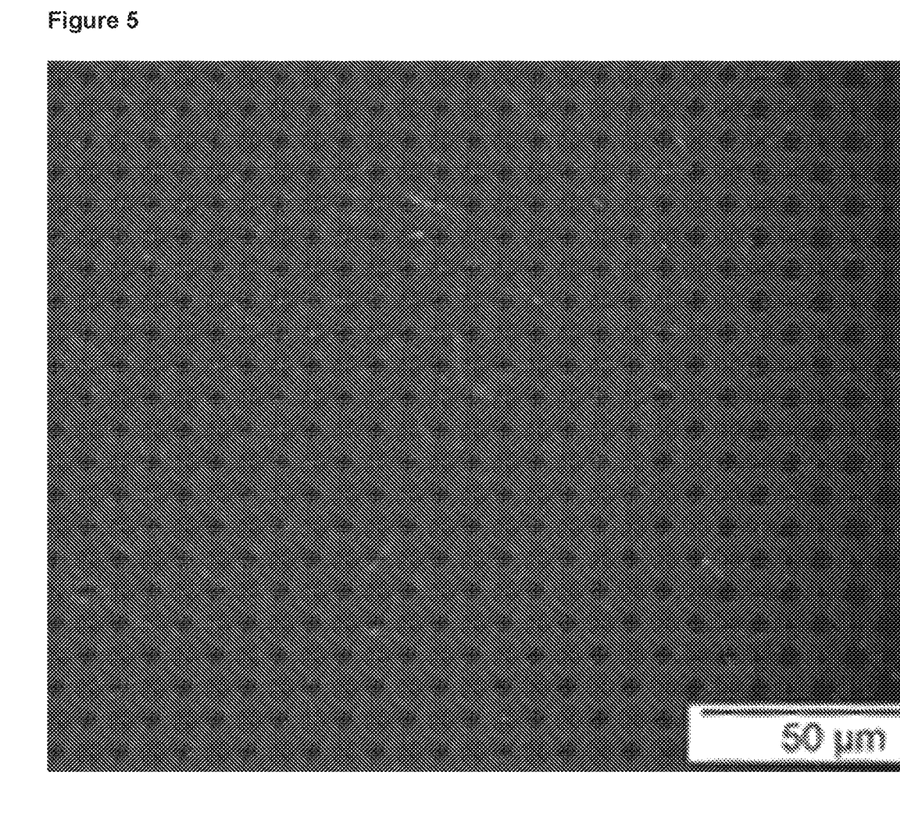
FIG. 5 is a microscope photograph of the waste materials collected after a filtering step according to an aspect of the present invention.

FIG. 5 is a microscope photograph of the waste materials collected during the three filtering steps according to step 8 of the exemplary embodiment (e.g. the permeate formed in FIG. 1). The waste materials are generally short nanowires, small nanostructures and waste reactants which would otherwise taint the silver nanowires. The image of FIG. 5 was obtained using an optical microscope with 50× magnification. The microscope used to take the image was an Olympus BX60M and the camera was an Olympus SC30.

Figure 6:
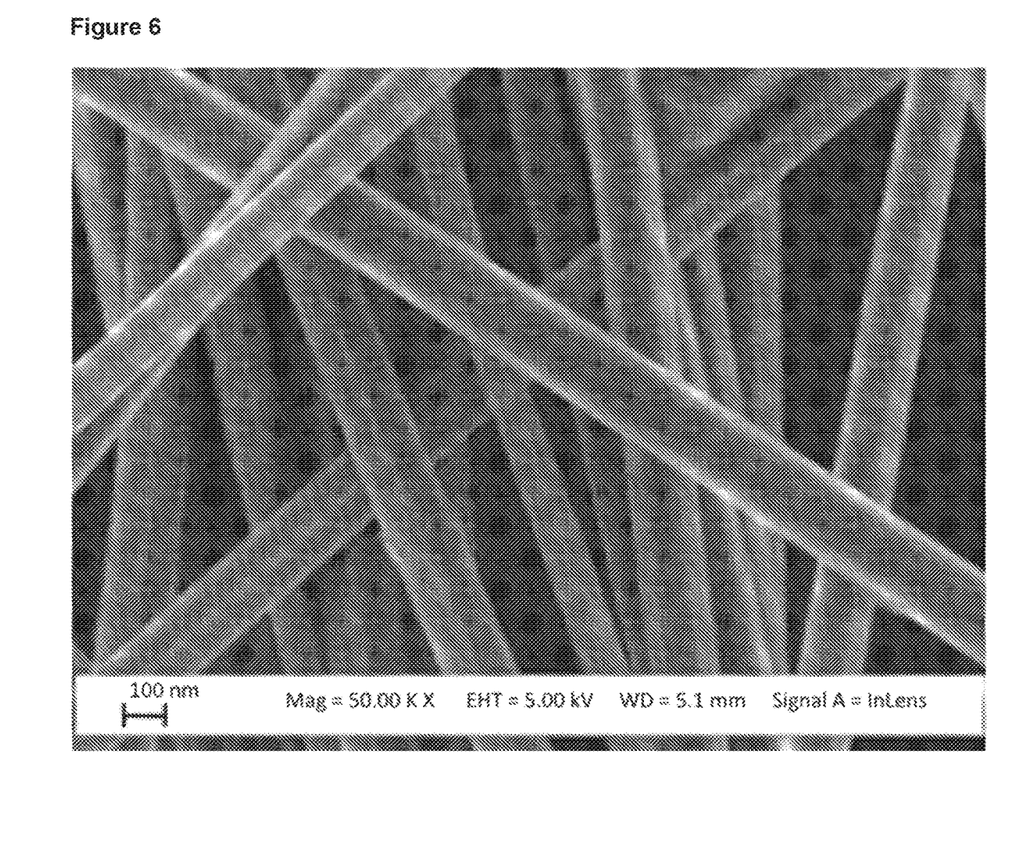
FIG. 6 is a scanning electron microscope photograph of the silver nanowires shown in FIG. 4.

FIG. 6 is a scanning electron microscope photograph of the silver nanowires shown in FIG. 4. This photograph shows that the nanowires are generally uniform and there is no if little amount of impurities. The image of FIG. 6 was obtained using an SEM with 50K magnification. The SEM used to take the image was a Zeiss Ultra Plus FESEM.

Figure 7:
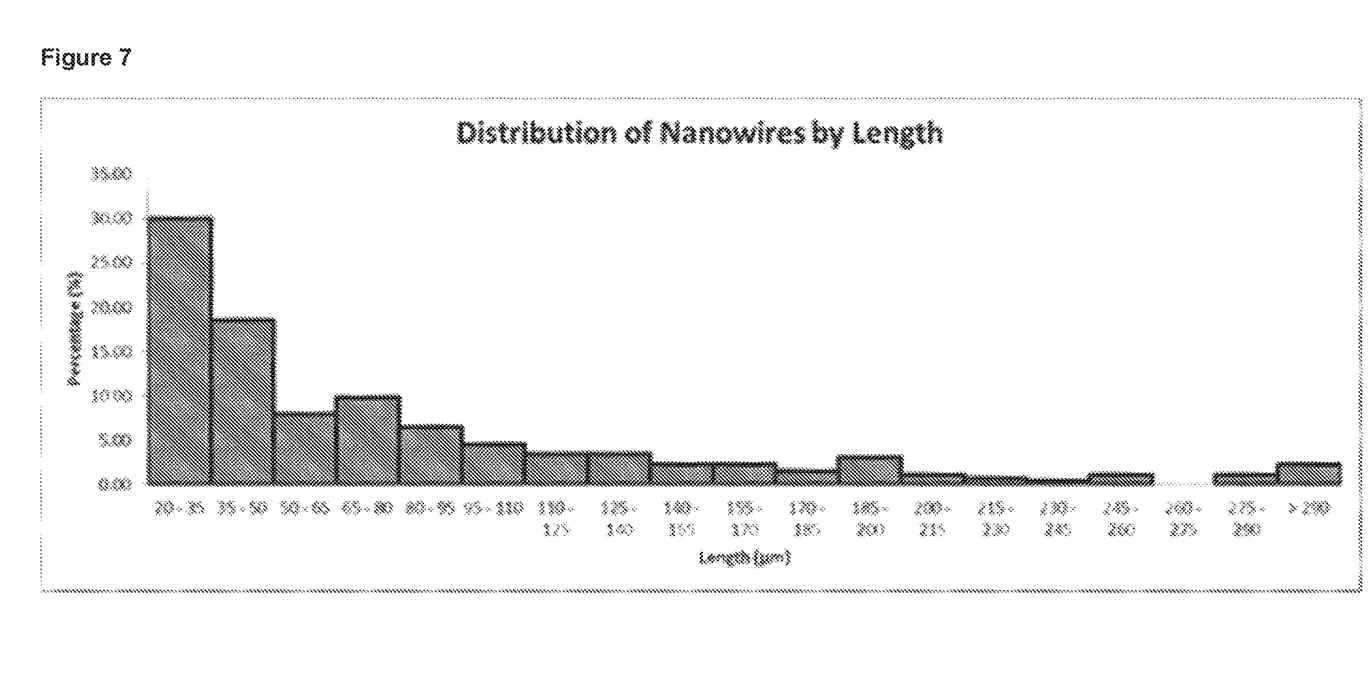
FIG. 7 shows the distribution of nanowires by length before a filtering step according to an aspect of the present invention, i.e. as shown pictorially in FIG. 2.

FIG. 7 shows the distribution of nanowires by length before a filtering step according to the present invention, i.e. as shown in FIG. 2. There was a wide distribution of nanowire lengths. The nanowire lengths were measured using an optical microscope with 50× magnification in conjunction with a calibrated ruler.

Figure 8:
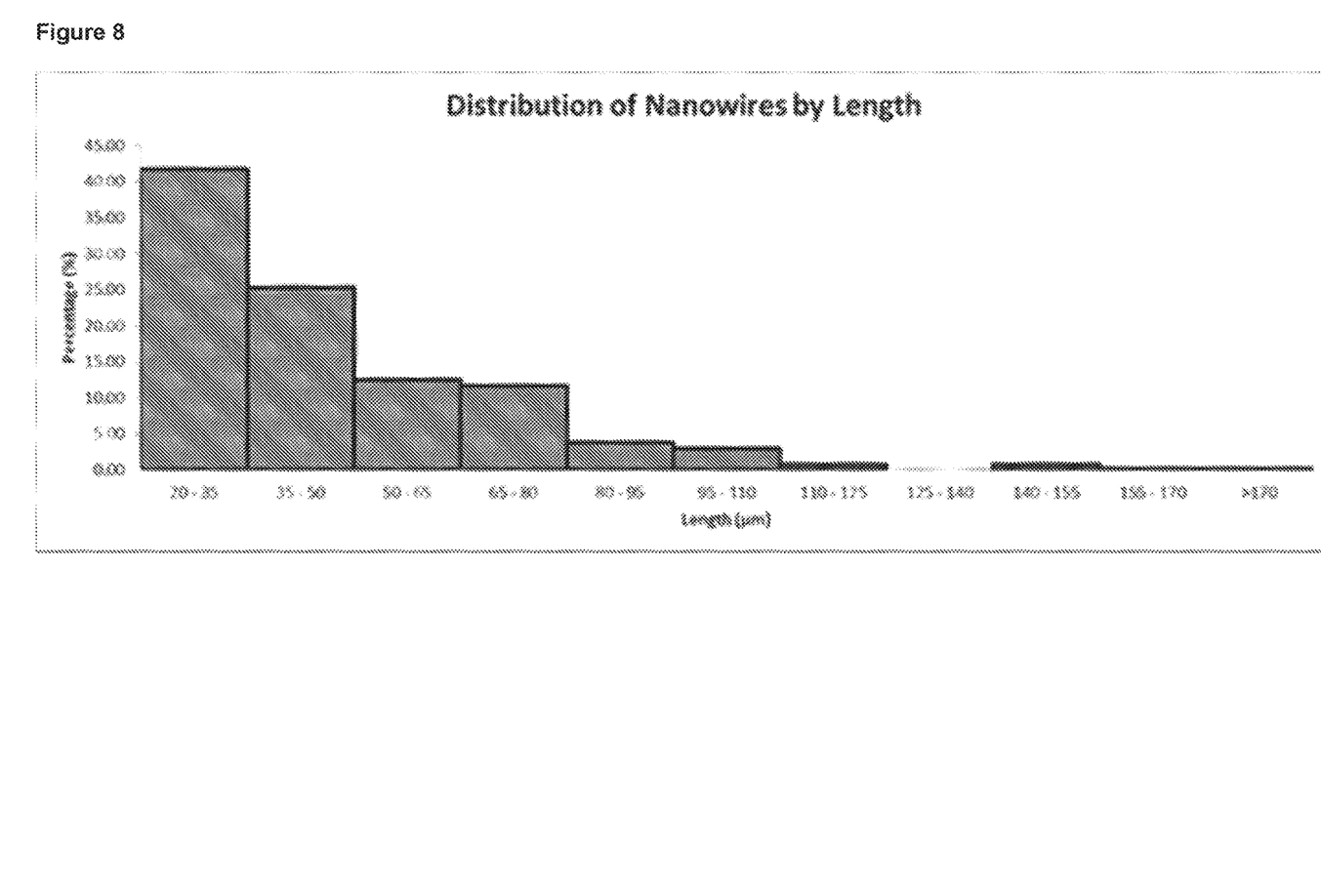
FIG. 8 shows the distribution of nanowires by length after a filtering step according to an aspect of the present invention, i.e. as shown pictorially in FIG. 4.

FIG. 8 shows the distribution of nanowires by length after a filtering step according to the present invention, i.e., as shown in FIG. 4. The method of the present invention removed relatively longer nanowires and the majority of nanowires remaining were in the length range from 20-80 μm. The yield of nanowires was 40% or more.

The above discussion relates to the specific example of the preparation of silver nanowires. The present invention is equally applicable in the preparation of relatively pure nanostructures of other metals, metal alloys and semiconductors.

As can be seen from the above results, methods of purifying and forming nanostructures according to the present invention provide beneficial results.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of purifying nanostructures, the method comprising:
providing a plurality of nanostructures in solution; and
filtering the nanostructures in solution by cross-flow filtration;
wherein the step of filtering the nanostructures in solution by cross-flow filtration includes a step of passing the solution comprising nanostructures through a cross-flow filter; and
wherein the step of passing the solution comprising nanostructures through a cross-flow filter includes passing the solution through a cross-flow filter having a mean mesh size of 20 to 40 μm.

2. The method of claim 1, wherein the nanostructures are nanowires.

3. The method of claim 2, wherein the nanowires are metallic or semiconducting.

4. The method of claim 3, wherein the nanowires are metallic and include one or more of Ag, Au, Pt, Cu, Co, Fe and Ni.

5. The method of claim 2, wherein the nanowires have a length (longest dimension) of from 30 μm to 90 μm.

6. The method of claim 2, wherein the nanowires have a width (shortest dimension) of from 80 nm to 150 nm.

7. The method of claim 2, wherein the nanowires have an aspect ratio (length divided by width) of from 200 to 900.

8. The method of claim 1, wherein the step of providing a plurality of nanostructures in solution includes forming the nanostructures.

9. The method of claim 8, wherein forming the nanostructures includes forming the nanostructures by the polyol method.

10. The method of claim 9, wherein the nanostructures are silver nanowires and the polyol method proceeds by the reactions:

$$2HOCH_2CH_2OH \rightarrow 2CH_3CHO + 2H_2O$$

$$2Ag^+ 2CH_3CHO \rightarrow CH_3CHO\text{-}OHCCH_3 + 2Ag + 2H^+.$$

11. The method of claim 8, wherein the step of forming the nanostructures occurs on a scale of greater than 1 litre batches.

12. The method of claim 1, wherein step of passing the solution comprising nanostructures through a cross-flow filter includes passing the solution through a cross-flow filter having a mean mesh size of 30 μm plus or minus 10%.

13. The method of claim 1, wherein the step of filtering the nanostructures in solution by cross-flow filtration includes the step of passing the solution comprising nanostructures through a cross-flow filter at a rate of 400 ml/min to 2 l/min.

14. The method of claim 1, wherein the step of filtering the nanostructures in solution by cross-flow filtration includes the step of passing the solution comprising nanostructures through a cross-flow filter at a rate of 500 ml/min to 1 l/min.

15. The method of claim 1, wherein the step of filtering the nanostructures in solution by cross-flow filtration includes the step of passing the solution comprising nanostructures through a cross-flow filter wherein the cross-flow filter comprises a metal mesh and a membrane, the cross-flow filter comprising a vibration system for vibrating the mesh and mitigating clogging of the membrane.

* * * * *